United States Patent
Sur et al.

(10) Patent No.: US 10,587,353 B2
(45) Date of Patent: Mar. 10, 2020

(54) MU-MIMO GROUP ASSIGNMENT

(71) Applicant: Hewlett Packard Enterprise Development LP, Houston, TX (US)

(72) Inventors: Sanjib Sur, Ripon, WI (US); Ioannis Pefkianakis, Palo Alto, CA (US); Souvik Sen, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/061,933

(22) PCT Filed: Feb. 19, 2016

(86) PCT No.: PCT/US2016/018674
§ 371 (c)(1),
(2) Date: Jun. 13, 2018

(87) PCT Pub. No.: WO2017/142551
PCT Pub. Date: Aug. 24, 2017

(65) Prior Publication Data
US 2018/0375597 A1    Dec. 27, 2018

(51) Int. Cl.
| H04B 7/02 | (2018.01) |
| H04B 17/336 | (2015.01) |
| H04B 7/0452 | (2017.01) |
| H04B 7/06 | (2006.01) |

(52) U.S. Cl.
CPC ......... H04B 17/336 (2015.01); H04B 7/0452 (2013.01); H04B 7/0617 (2013.01); H04B 7/0626 (2013.01); H04B 7/0634 (2013.01)

(58) Field of Classification Search
CPC .. H04B 17/336; H04B 7/0634; H04B 7/0626; H04B 7/0452; H04B 7/0617

USPC ......................................................... 375/262
See application file for complete search history.

(56) References Cited

U.S. PATENT DOCUMENTS

| 4,244,800 | A  | 1/1981 | Frazzini et al. |
| 8,064,817 | B1 | 11/2011 | Ziv |
| 8,861,499 | B1 | 12/2014 | Narasimhan et al. |
| 8,934,328 | B2 | 1/2015 | Shapira et al. |
| 2004/0108224 | A1 | 6/2004 | Robertson et al. |

(Continued)

FOREIGN PATENT DOCUMENTS

CN    103927909 A    7/2014

OTHER PUBLICATIONS

International Searching Authority, The International Search Report and the Written Opinion, dated Nov. 9, 2016, PCT/US2016/018674, 12 Pgs.

(Continued)

*Primary Examiner* — Don N Vo
(74) *Attorney, Agent, or Firm* — Hewlett Packard Enterprise Patent Department

(57) ABSTRACT

An example communications device includes communications circuitry and control circuitry. The communications circuitry may wirelessly communicate with client devices. The control circuitry may determine signal-to-interference-plus-noise ratios (SINRs) for the client devices based on compressed client-side channel state information received from the client devices. The control circuitry may assign the client devices to multi-user-multiple-input-multiple-output (MU-MIMO) groups based on the SINRs.

9 Claims, 14 Drawing Sheets

(56) References Cited

U.S. PATENT DOCUMENTS

| | | | |
|---|---|---|---|
| 2005/0249151 | A1 | 11/2005 | Takano |
| 2008/0165875 | A1* | 7/2008 | Mundarath .......... H04B 7/0417 375/262 |
| 2012/0063336 | A1 | 3/2012 | Shany et al. |
| 2012/0315938 | A1 | 12/2012 | Van Nee |
| 2013/0028309 | A1 | 1/2013 | Park et al. |
| 2013/0251264 | A1 | 9/2013 | Forcke et al. |
| 2014/0177747 | A1* | 6/2014 | Ruiz Delgado ...... H04B 7/0452 375/267 |
| 2015/0029979 | A1* | 1/2015 | Onodera ............. H04W 72/121 370/329 |
| 2015/0064681 | A1 | 3/2015 | Stahovich et al. |
| 2015/0146807 | A1 | 5/2015 | Zhang et al. |
| 2015/0147728 | A1 | 5/2015 | Hochenbaum et al. |
| 2015/0326339 | A1 | 11/2015 | Huang |
| 2016/0337879 | A1* | 11/2016 | Hwang ................ H04B 17/336 |
| 2017/0063438 | A1* | 3/2017 | Baik ...................... H04L 5/006 |
| 2017/0064566 | A1* | 3/2017 | Elsherif ................ H04W 16/28 |
| 2017/0244513 | A1* | 8/2017 | Pitakdumrongkija ....................... H04B 7/0452 |

OTHER PUBLICATIONS

Maria D. Chang and Kenneth D. Forbus, "Clustering Hand-drawn Sketches via Analogical Generalization," Apr. 7, 2013, pp. 1-6, Association for the Advancement of Artificial Intelligence.

Balan et al., "AirSync: Enabling Distributed Multiuser MIMO With Full Spatial Multiplexing", IEEE/ACM Transactions on Networking, vol. 21, Issue 6, 2013, 14 pages.

Bejarano et al., "MUTE: sounding inhibition for MU-MIMO wlans", 2014, 9 pages.

Esslaoui et al., "A fair MU-MIMO scheme for IEEE 802.11ac", International Symposium on Wireless Communication Systems (ISWCS), 2012, pp. 1049-1053.

Gesbert et al., "Shifting the MIMO Paradigm", IEEE Signal Processing Magazine, vol. 24, Issue 5, Sep. 2007, pp. 36-46.

Goldsmith et al., "Capacity limits of mimo channels", IEEE Journal on Selected Areas in Communications, vol. 21, Issue 5, Jun. 2003, pp. 684-702.

Halperin et al., "Predictable 802.11 packet delivery from wireless channel measurements", Proceedings of the ACM SIGCOMM 2010 conference, 2010, 12 pages.

Hsu et al., "Client-AP Association for Multiuser MIMO Networks", 2015, 6 pages.

Kate Ching-Ju Lin, "Multiuser MIMO Systems: From Rate Adaptation to User Selection", Nov. 6, 2015, 3 pages.

Narendra et al., "Mode and user selection for multi-user mimo wlans without csi", IEEE Conference on Computer Communications (INFOCOM), 2015, 9 pages.

Rahul et al., "MegaMIMO: Scaling Wireless Capacity with User Demands", In ACM SIGCOMM 2012, Helsinki, Finland, Aug. 2012, 12 pages.

Saha et al., "Power-throughput tradeoffs of 802.11n/ac in smartphones", IEEE Conference on Computer Communications (INFOCOM), 2015, 9 pages.

Shen et al., "Low Complexity User Selection Algorithms for Multiuser MIMO Systems with Block Diagonalization", IEEE Transaction on Signal Processing, vol. 54, Issue 9, Sep. 2006, 5 pages.

Shepard et al., "Argos: Practical Many-Antenna Base Stations", Proceedings of the 18th annual international conference on Mobile computing and networking, 2012, 12 pages.

Wasim Q. Malik, "Spatial Correlation in Ultrawideband Channels", IEEE Transactions on Wireless Communications, vol. 7, Issue 2, 2008, pp. 604-610.

Xie et al., "Adaptive Feedback Compression for MIMO Networks", Proceedings of the 19th annual international conference on Mobile computing & networking, 12 pages.

Xie et al., "Scalable User Selection for MU-MIMO Networks", In Proc. of IEEE INFOCOM, 2014, pp. 808-816.

Xiong et al., "Midas: Empowering 802.11ac networks with multiple-input distributed antenna systems", Proceedings of the 10th ACM International on Conference on emerging Networking Experiments and Technologies, 2014, pp. 29-40.

Yoo et al., "Multi-Antenna Downlink Channels with Limited Feedback and User Selection", IEEE Journal on Selected Areas in Communications, vol. 25, Issue 7, Sep. 2007, pp. 1478-1491.

Zeng et al., "A First Look at 802.11ac in Action: Energy Efficiency and Interference Characterization", In IFIP Networking, 2014, 9 pages.

Zhang, et al., "NEMOx: Scalable Network MIMO for Wireless Networks", Proceedings of the 19th annual international conference on Mobile computing & networking, 2013, 12 pages.

Zhou et al., "Signpost: Scalable MUMIMO Signaling with Zero CSI Feedback", Proceedings of the 16th ACM International Symposium on Mobile Ad Hoc Networking and Computing, 2015, 10 pages.

* cited by examiner

MU-MIMO GROUP ASSIGNMENT

BACKGROUND

Multi-User-Multiple-Input-Multiple-Output (MU-MIMO) is a wireless communication technique that allows a communications device to transmit multiple distinct data streams over the same frequency channel concurrently to multiple client devices. The MU-MIMO capable communications device has multiple antennas and utilizes beamforming to transmit the multiple data streams via the multiple antennas (thus, the communications device is sometimes referred to as a beamformer). Beamforming involves varying parameters of the individual signals transmitted by the antennas (such as the phase or amplitude) so as to manipulate the combined radiation pattern that is emitted by the antennas in some desired way—for example, the radiation pattern may be spatially shaped in such a manner that the strength of the signal is increased at a client device's location. MU-MIMO utilizes a particular form of beamforming known as preceding, which is characterized by having multiple distinct data streams that are transmitted with independent weightings (as opposed to transmitting the same data stream from each antenna). By exploiting knowledge of channel states of the client devices, the MU-MIMO beamformer is able to use preceding to concurrently send multiple distinct data streams to multiple client devices, with each of the client devices being able to recover the stream that is intended for the client device from among all of the other transmitted streams and noise.

DETAILED DESCRIPTION

Figure 1:
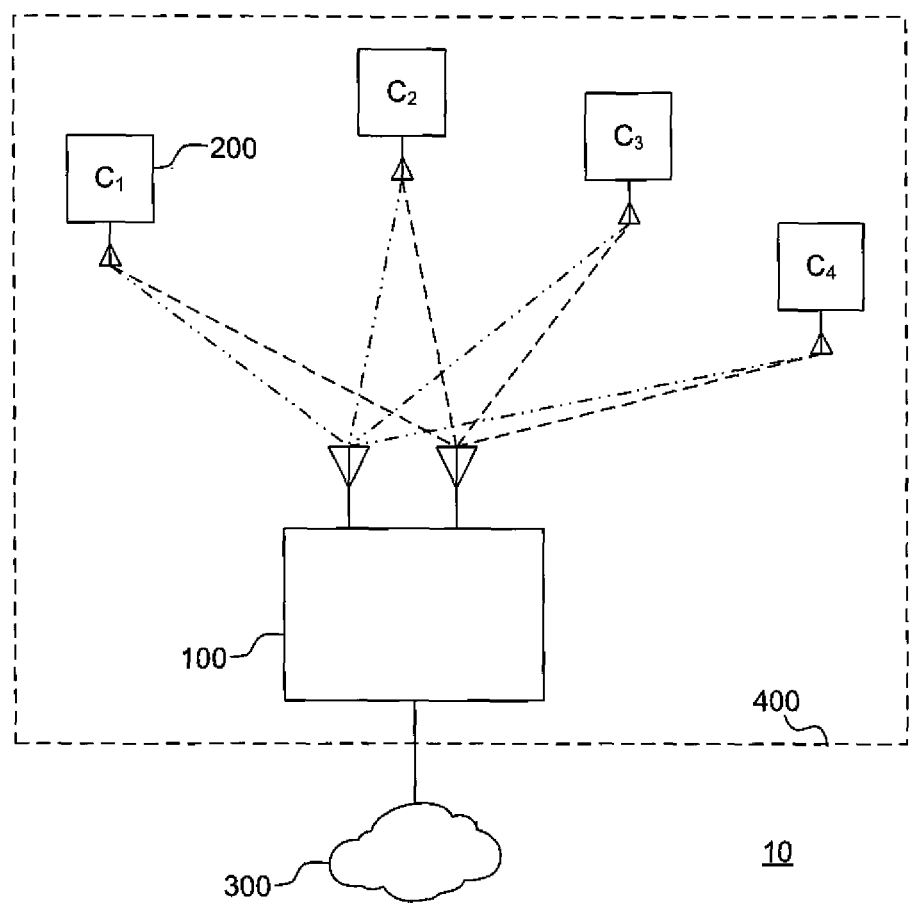
FIG. 1 is a conceptual diagram illustrating an example system.

FIG. 1 illustrates an example system 10. The example system 10 includes a communications device 100, client devices 200 ($C_1$-$C_4$), and an external network 300. The communications device 100 utilizes MU-MIMO techniques to wirelessly communicate with the client device 200, and may act as an access point to the network 300. The communications device 100 may be, for example, a Wi-Fi access point (such as an IEEE 802.11ac access point), a cellular communications base station (such as an eNodeB in a Long Term Evolution (LTE) network), a WiMAX base station (such as an IEEE 802.16e base station), and the like. The network 300 may be any wired or wireless network, such as, for example, a local area network (LAN), a wide area network (WAN), the internet, a telecommunications backhaul network (such as an Evolved Universal Mobile Telecommunications System Terrestrial Radio Access Network (E-UTRAN) in an LTE network), a telecommunications core network (such as an Evolved Packet Core in an LTE network), and so on. The communications device 100 and client devices 200 that are connected thereto may be referred to herein as a wireless network 400.

Figure 2:
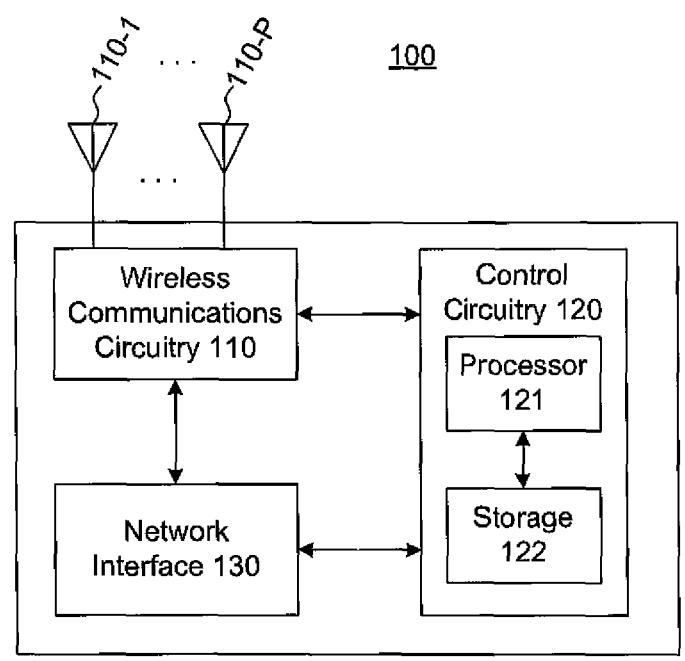
FIG. 2 is a conceptual diagram illustrating an example communications device.

FIG. 2 illustrates an example communications device 100. The communications device 100 includes wireless communications circuitry 110, control circuitry 120, and a network interface 130. The wireless communications circuitry 110 may use MU-MIMO techniques to wirelessly transmit messages to the client devices 200. The wireless communications circuitry 110 may also receive messages wirelessly transmitted from the client devices 200. The network interface 130 may connect the communications device 120 to a network, such as the network 300. The control circuitry 120 may control the wireless communications circuitry 110. The control circuitry 120 may also control the network interface 130.

The wireless communications circuitry 110 includes antennas 110-1 through 110-P, where P is an integer equal to or greater than two. The antennas 110-1 through 110-P may transmit and/or receive signals in the form of electromagnetic radiation. Any portion of the electromagnetic spectrum may be used to transmit/receive messages. A transport protocol adopted by the communications device 100 may specify a particular portion of the electromagnetic spectrum for transmission/reception (for example, IEEE 802.11ac specifies a 5 Ghz band). The wireless communications circuitry 110 may transmit up to P distinct transmission streams concurrently via the antennas 110-1 through 110-P, using MU-MIMO techniques. The wireless communications circuitry 110 may generate the transmission streams by packaging messages that are to be transmitted into transmission frames (e.g., MAC and PHY framing) according to the wireless transmission protocol adopted by the communications device 100, mapping the transmission frames to transmission symbols according to a modulation scheme and modulating a carrier signal based on the transmission symbols, and wirelessly transmitting the modulated signals via amplifiers and the antennas 110-1 through 110-P. Examples of wireless transmission protocols include IEEE 802.11, IEEE 802.16, 3GPP E-UTRA, and the like. Examples of modulation schemes include quadrature amplitude modulation (QAM), phase-shift keying (PSK), frequency-shift keying (FSK), amplitude-shift keying (ASK), frequency-division multiplexing (FDM), orthogonal frequency-division multiplexing (OFDM), continuous phase modulation (CPM), and the like. Some wireless transmission protocols specify use of a particular modulation schemes; for example, IEEE 802.11ac specifies use of QAM modulation. The wireless communications circuitry 110 may include circuitry for generating the carrier signal such as an oscillator, a modulator for modulating the carrier signal, filters, amplifiers, and the like. The wireless communications circuitry 110 may also include precoding circuitry that applies weights to the P signals using MU-MIMO techniques. The precoding weights may be determined by the control circuitry 120 (described in greater detail below). The wireless communications circuitry 110 may also receive wireless transmissions from client devices via the antennas 110-1 through 110-P, and may demodulate the received signals via demodulation circuitry to obtain reception frames. Reception frames whose payload is intended to go to the network 300 (e.g., data plane messages) may be sent to the network 300 via the network interface 130, while reception frames that include control plane messages may be sent to the control circuitry 120 for processing.

The control circuitry 120 may include a processor 121 and storage 122. The processor 121 may be any circuitry capable of executing machine-readable instructions, such as a central processing unit (CPU), a microprocessor, a microcontroller, a digital signal processor (DSP), a field-programmable gate array (FPGA), an application-specific instruction set processor (ASIP), etc. The storage 122 may be any non-transitory machine readable medium, which may include volatile storage media (e.g., DRAM, SRAM, etc.) and/or non-volatile storage media (e.g., PROM, EPROM, EEPROM, NVRAM, hard drives, optical disks, etc.). The storage 122 may store machine-readable instructions that, when executed by the processor 121, cause the control circuitry 120 to perform the operations described herein, such as the operations described in FIGS. 3-14. The control circuitry 120 may also include an application-specific integrated circuit (ASIC) in lieu of (or in addition to) the processor 121 and storage 122 to perform one, some, or all of the operations described herein.

The control circuitry 120 may control the operations of the wireless communications circuitry 110 and/or the network interface 130. The control circuitry 120 may also determine precoding weights to be applied to the transmission streams based on MU-MIMO techniques. For example, each client device 200 may send to the communications device 100 beamforming feedback that includes at least some information describing the state of the client device 200's channel (such as the matrix $V_k$, discussed in greater detail below), and the control circuitry 120 may use the beamforming feedback to generate a steering matrix (which is an example of the precoding weights). The steering matrix may then be applied to the transmission streams. The control circuitry 120 may also generate control plane messages to be sent to client devices 200 via the wireless communications circuitry 110, and may process control plane messages received from client devices 200.

In particular, the control circuitry 120 may assign the client devices 200 to MU-MIMO groups. The MU-MIMO group assignments are used to determine which ones of the client devices 200 should be transmitted to concurrently during a given data-plane transmission interval. In particular, one MU-MIMO group is transmitted to at a time during separate data-plane transmission intervals. When a MU-MIMO group is the transmission target, all of the client devices 200 in the target MU-MIMO group may have their distinct data streams transmitted concurrently during the transmission interval using MU-MIMO techniques. The client devices 200 of any other MU-MIMO groups that are not the current transmission target are not transmitted to during the transmission interval. Thus, if the client devices 200 are divided into M MU-MIMO groups, then it will take M transmission intervals to transmit distinct messages to all of the client devices 200. This number of transmission intervals (M) is generally less than the number of transmission intervals to sequentially transmit to all of the client devices 200. Thus, by decreasing the number of transmission intervals needed to transmit to all of the client devices 200, using MU-MIMO techniques can improve overall network performance as compared to approaches that sequentially transmit to the client devices 200.

The control circuitry 120 may divide the client devices 200 into MU-MIMO groups for a variety of reasons. For example, the control circuitry 120 may divide the client devices 200 into groups because the number of client devices 200 connected to the communications device 100 exceeds a maximum number of client devices 200 that the communications device 100 is able to concurrently transmit distinct data streams to. For example, if the example communications device 100 shown in FIG. 1 were able to transmit distinct data streams concurrently to a maximum of two client devices 200 at a time, then the example communications device 100 would need at least two transmission intervals to transmit distinct messages to all of the client devices 200 $C_1$ through $C_4$, and thus would need to divide the client devices 200 $C_1$ through $C_4$ into at least two MU-MIMO groups. In general, the maximum number of client devices 200 to which distinct data streams may be concurrently transmitted is related to the number of antennas that the communications device 100 has. As another example, the client devices 200 may be divided into MU-MIMO groups in order to improve some measure of performance of the wireless network 400. For example, even if the number of client devices 200 did not exceed the maximum number that the communications device 100 is able to concurrently transmit to, dividing the client devices 200 into groups may increase an aggregate throughput of the data transmitted to the client devices 200. This may be the case, for example, when the channel of one client device 200 strongly interferes with the channel of another client device 200.

The choice of which client devices 200 to include in which MU-MIMO groups can affect performance of the wireless network 400. For example, the ability of a given client device 200 to extract its intended data stream from the other data streams that are concurrently emitted by the communications device 100 may depend on which other client devices 200 are in the same MU-MIMO group as the given client device 200. For example, if a first client device 200 ($C_1$) and a second client device 200 ($C_2$) are located relative to one another in such a way that their respective channels interfere with each other, then including $C_1$ and $C_2$ in the same MU-MIMO group could make it more difficult for $C_1$ and/or $C_2$ to extract their intended data streams from the combined group transmission. This could result in increased packet errors and retransmissions of data, thus lowering the aggregate throughput. On the other hand, if the first client device 200 ($C_1$) and the third client device ($C_3$) are located relative to one another in such a way that their respective channels do not interfere very much (or even better, not at all), then $C_1$ and $C_2$ may be included in the same MU-MIMO group without degrading network performance. Thus, in assigning the client devices 200 to MU-MIMO groups, the control circuitry 120 may take into account the impact of the groupings on network performance. For example, the control circuitry 120 may assign client devices to MU-MIMO groups by performing any of the example processes illustrated in FIGS. 3-14 (discussed further below).

The network interface 130 connects the communications device 100 to a network, such as the network 300. The network interface 130 includes at least one communications port that is connectable to the network, and may pass data between the wireless communications circuitry 110 and the network via the communications port. The network interface 130 may act as a hub, a bridge, a switch, a router, etc.

While the wireless communications circuitry 110, the control circuitry 120, and the network interface 130 are illustrated in FIG. 2 and described above separately, this is merely for ease of explanation and does not imply that these components are necessarily physically or logically separated. For example, the wireless communications circuitry 110 and the control circuitry 120 may be part of the same ASIC, such as a wireless transceiver chipset, and they may overlap with one another physically and/or functionally. Moreover, a particular operation may appropriately be described as being performed simultaneously by both the wireless communications circuitry 110 and the control circuitry 120, since the control circuitry 120 may control the wireless communications circuitry 110. For example, the wireless communications circuitry 110 may be said to modulate a carrier signal because it physically alters a parameter of the carrier signal, but the control circuitry 120 may also be said to modulate the carrier signal because it controls the wireless communications circuitry 110 in the modulation.

Figure 3:
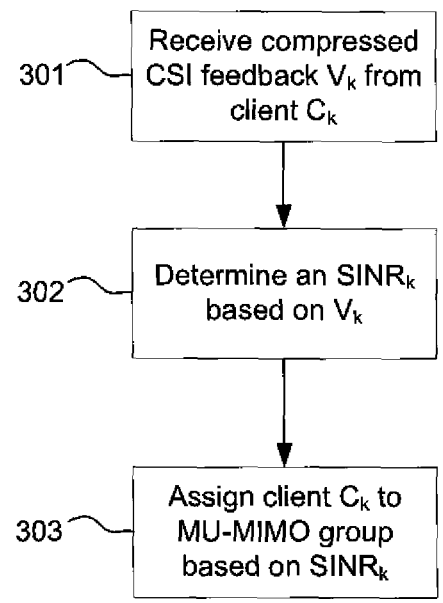
FIG. 3 is a process flow diagram illustrating an example process.

FIG. 3 illustrates an example process for assigning clients (such as the client devices 200) to MU-MIMO groups. This process may be performed, for example, by a beamformer (such as the communications device 100).

Figure 4:
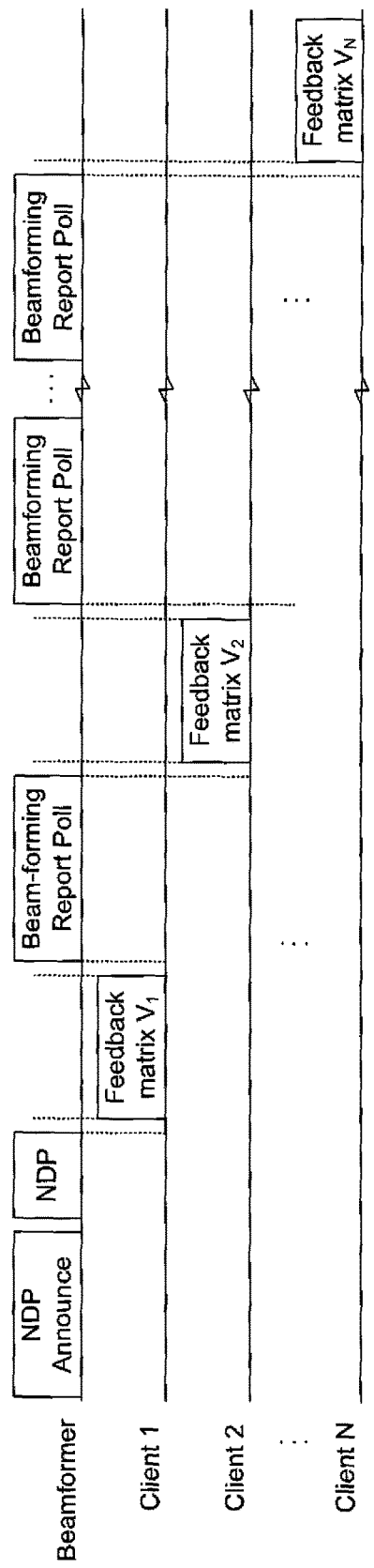
FIG. 4 is a signal diagram illustrating an example signal exchange.

In block 301, compressed client-side channel state information (CSI) feedback $V_k$ is received from a given client $C_k$, which may be, for example, one of the client devices 200. As used herein and in the appended claims, "compressed client-side channel state information" for a given client means a representation of information that: (1) is based on a representation of channel side information as determined by the client, and (2) contains only part of the information contained in the full representation of the channel side information determined by the client. Note that the state of the channel may appear differently to the beamformer and the client $C_k$, and hence "client-side" and "beamformer-side" are used herein to specify which side is measuring the CSI. For example, the client-side CSI measured by the client $C_k$ may be represented by a channel matrix $H_k$, in which case the compressed client-side CSI feedback $V_k$ may be one of the component matrices of the singular value decomposition of $H_k$. For example, the compressed client-side CSI feedback may be the matrix $V_k$ from the singular value decomposition of $H_k$ as represented by $H_k = U_k \cdot D_k \cdot V_k^H$. For example, the IEEE 802.11ac standard specifics that the clients send the matrix $V_k$ as beamforming feedback as part of a sounding procedure. In particular, in the IEEE 802.11ac standard the clients measure $H_k$, but do not send back $H_k$ to the beamformer, since $H_k$ is too large; instead, the client devices derive $V_k$ from $H_k$ and send back $V_k$ to the beamformer. FIG. 4 illustrates one example of how block 301 may be implemented (discussed further below).

Figure 8:
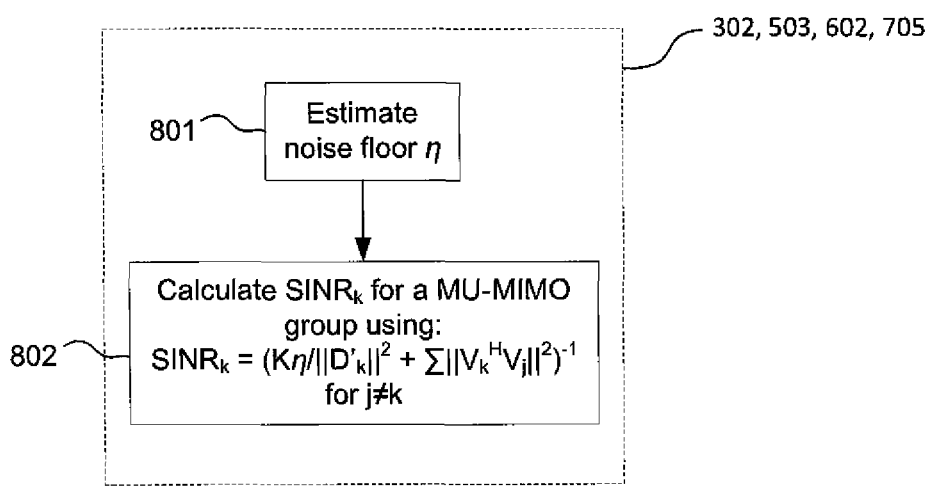
FIG. 8 is a process flow diagram illustrating another example process

In block 302, a value $SINR_k$, which represents an estimate of what the signal-to-interference-plus-noise ratio of the client $C_k$ would be in a given MU-MIMO group, is determined based on the compressed client-side CSI feedback $V_k$. Note that the client $C_k$ could have a different $SINR_k$ for each potential MU-MIMO group. FIG. 8 (discussed further below) illustrates one example of how the $SINR_k$ may be determined based on the compressed client-side CSI.

Figure 9:
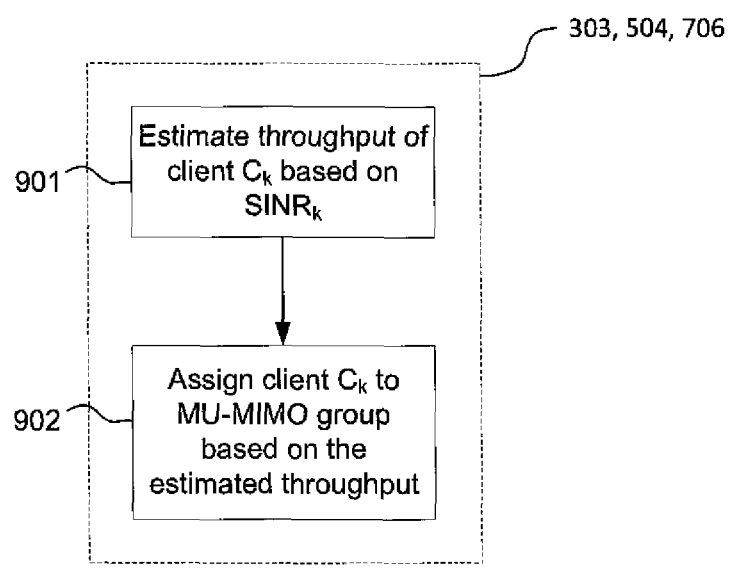
FIG. 9 is a process flow diagram illustrating another example process

In block 303, the client $C_k$ is assigned to a MU-MIMO group based on the $SINR_k$, which was determined based on the compressed client-side CSI feedback $V_k$. FIG. 9 (discussed further below) illustrates one example of how the client $C_k$ may be assigned to a MU-MIMO group based on the $SINR_k$.

Thus, in the example process of FIG. 3, the client $C_k$ may be assigned to a MU-MIMO group based on a SINR value that is determined using compressed client-side CSI feedback $V_k$. A full representation of the client-side CSI (such as the channel matrix $H_k$) can be very large, and thus if client devices were to transmit full CSI to a beamformer (such as the communications device 100) network overhead may be high. Thus, using the compressed client-side CSI feedback $V_k$ to determine SINR and assigning the clients to MU-MIMO groups based on the SINR reduces network overhead as compared to a case in which full CSI is used to assign clients to MU-MIMO groups. Thus, the functioning of the beamformer and the efficiency of the network are improved by utilizing the example process of FIG. 3. Moreover, various standards (such as IEEE 802.11ac) might not provide for transmission of full CSI by clients to the beamformer, and thus approaches for assigning clients to MU-MIMO groups that rely on the beamformer knowing the full CSI might not be compatible with such standards. On the other hand, various standards (such as IEEE 802.11ac) may provide for transmission of the beamforming feedback $V_k$ from the clients to the beamformer, and thus the example process of FIG. 3 would be compatible with such standards.

FIG. 4 illustrates an example sounding procedure, which is one example way in which the compressed client-side CSI feedback $V_k$ may be received in block 301 of the example process of FIG. 3. This process may be performed, for example, by a beamformer (such as the communications device 100). In the example sounding procedure, the beamformer sends a null-data-packet (NDP) announcement followed by a NDP to clients $C_1$ through $C_N$ (which may be examples of the client devices 200). The clients $C_1$ through $C_N$ may use the NDP to measure their channel state and obtain their respective channel matrices $H_1$ through $H_N$ (which represent the full CSI), and from this the clients $C_1$ through $C_N$ may obtain their respective compressed client-side CSI feedback $V_1$ through $V_N$. In particular, the client $C_k$ may find the singular value decomposition of $H_k$, $H_k = U_k \cdot D_k \cdot V_k^H$, and from this obtain $V_k$. The client device $C_1$ sends the compressed client-side CSI feedback matrix $V_1$ to the beamformer. The beamformer sends a beamforming report poll, and then client $C_2$ sends compressed client-side CSI feedback matrix $V_2$ to the beamformer. This is repeated until client $C_N$ has sent compressed client-side CSI feedback matrix $V_N$ to the beamformer.

Figure 5:
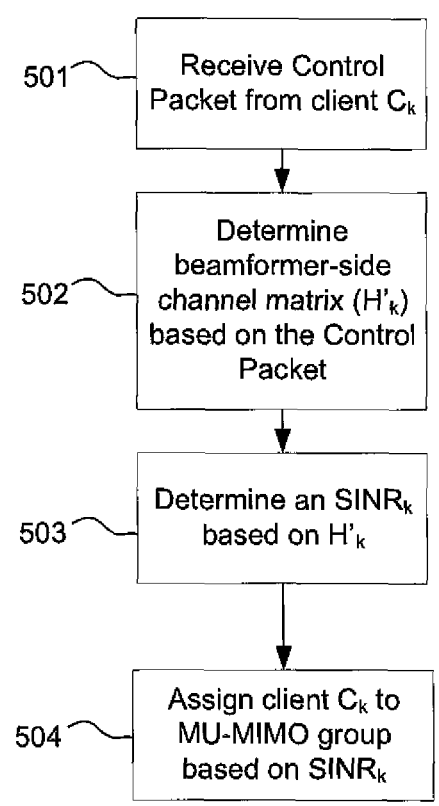
FIG. 5 is a process flow diagram illustrating another example process.

FIG. 5 illustrates another example process for assigning clients (such as the client devices 200) to MU-MIMO groups. This process may be performed, for example, by a beamformer (such as the communications device 100).

In block 501, a control packet is received from a client $C_k$, which may be one of the client devices 200. The control packet may be any control-plane packet, such as an acknowledgement (ACK) packet or Request to Send/Clear to Send (RTS/CTS) packet. Control packets may be transmitted from clients to the beamformer for a variety of reasons, and any such control packet may be serve as the control packet received in block 501. In other words, the client does not necessarily need to specially generate a control packet solely for use in the process of FIG. 5, but rather a control packet that is already going to be generated for some other purpose may also serve as the control packet of block 501. Thus, the process of FIG. 5 does not necessarily increasing the amount of control-plane signaling.

In block 502, a beamformer-side channel matrix $H'_k$ is determined based on the received control packet. The channel matrix $H'_k$ represents beamformer-side CSI, which indicates the state of the channel between the client $C_k$ and the beamformer as measured at the beamformer. Note that the matrix $H'_k$ may be different from the matrix $H_k$, since CSI as measured by the beamformer (i.e., beamformer-side CSI) and CSI as measured by the client $C_k$ (i.e., client-side CSI) may be different.

Figure 6:
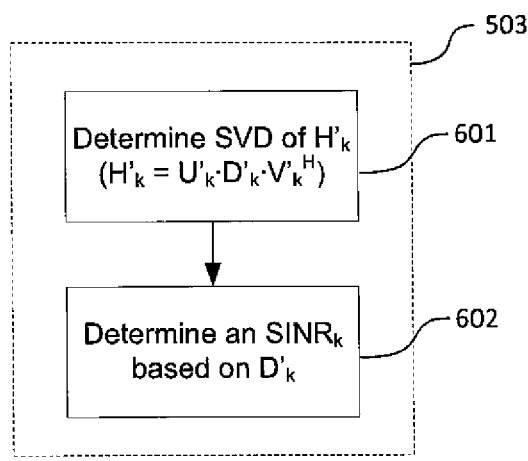
FIG. 6 is a process flow diagram illustrating another example process.

In block 503 a value $SINR_k$, which represents an estimate of what the signal-to-interference-plus-noise ratio of the client $C_k$ would be in a given MU-MIMO group, is determined based on the beamformer-side channel matrix $H'_k$. Note that the client $C_k$ could have a different $SINR_k$ for each potential MU-MIMO group. FIG. 6 (discussed below) illustrates one example of how an $SINR_k$ may be determined based on the beamformer-side channel matrix $H'_k$.

In block 504 the client $C_k$ is assigned to a MU-MIMO group based on the $SINR_k$, which was determined based on the beamformer-side channel matrix $H'_k$. FIG. 9 (discussed further below) illustrates one example of how the client $C_k$ may be assigned to a MU-MIMO group based on the $SINR_k$.

Thus, in the example process of FIG. 5, the client $C_k$ may be assigned to a MU-MIMO group based on a value $SINR_k$, which is determined using a beamformer-side channel matrix $H'_k$. A full representation of the client-side CSI (such as the channel matrix $H_k$) can be very large, and thus if clients were to transmit full CSI to a beamformer, network overhead may be high. Thus, using the beamformer-side channel matrix $H'_k$ to determine SINR and assigning the clients to MU-MIMO groups based on the SINR reduces network overhead as compared to a case in which full CSI feedback is used to assign client device 200 to MU-MIMO groups. Thus, the functioning of the beamformer and the efficiency of the network are improved by utilizing the example process of FIG. 5.

FIG. 6 illustrates an example process of determining a value $SINR_k$, which represents an estimate of what the signal-to-interference-plus-noise ratio of the client $C_k$ would be in a given MU-MIMO group, based on the beamformer-side channel matrix $H'_k$. The process of FIG. 6 is one example of how block 503 from FIG. 5 may be implemented.

In block 601, the singular value decomposition of $H'_k$ is determined, which is given by $H'_k = U'_k \cdot D'_k \cdot V'^H_k$.

In block 602, the value $SINR_k$ is determined based on the matrix $D'_k$, which is obtained from the singular value decomposition of $H'_k$ from block 601.

Figure 7:
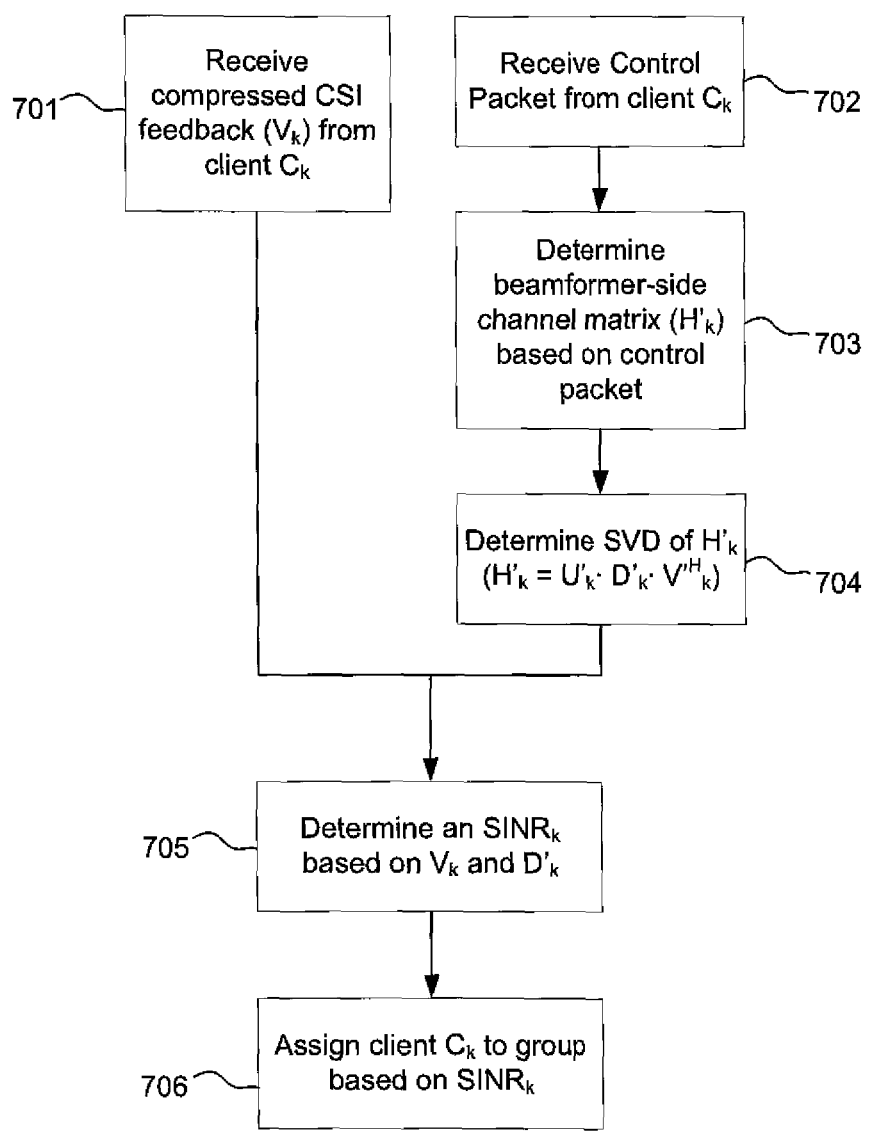
FIG. 7 is a process flow diagram illustrating another example process.

FIG. 7 illustrates an example process of assigning a client $C_k$ (such as one of the client devices 200) to a MU-MIMO group. The example process of FIG. 7 may be performed, for example, by a beamformer (such as the communications device 100).

In block 701, compressed client-side channel state information (CSI) feedback $V_k$ is received from a given client $C_k$, which may be, for example, one of the client devices 200. For example, the client-side CSI measured by the client $C_k$ may be represented by a channel matrix $H_k$, in which case the compressed client-side CSI feedback $V_k$ may be one of the component matrices of the singular value decomposition of $H_k$. For example, the compressed client-side CSI feedback may be the matrix $V_k$ from the singular value decomposition of $H_k$ as represented by $H_k = U_k \cdot D_k \cdot V^H_k$.

In block 702, a control packet is received from the client $C_k$. The control packet may be any control-plane packet, such as an acknowledgement (ACK) packet or Request to Send/Clear to Send (RTS/CTS) packet.

In block 703, a beamformer-side channel matrix $H'_k$ is determined based on the received control packet. The channel matrix $H'_k$ represents beamformer-side CSI, which indicates the state of the channel between the client $C_k$ and the beamformer as measured at the beamformer.

In block 704 the singular value decomposition of $H'_k$ is determined, which is given by $H'_k = U'_k \cdot D'_k \cdot V'^H_k$.

In block 705, a value $SINR_k$, which represents an estimate of what the signal-to-interference-plus-noise ratio of the client $C_k$ would be in a given MU-MIMO group, is determined based on the compressed client-side CSI feedback $V_k$ and on the matrix $D'_k$ (the matrix $D'_k$ is obtained from the singular value decomposition determined in block 704). Note that the client $C_k$ could have a different $SINR_k$ for each potential MU-MIMO group. FIG. 8 (discussed further below) illustrates one example of how the $SINR_k$ may be determined based on the compressed client-side CSI feedback $V_k$ and on the matrix $D'_k$.

In block 706 the client $C_k$ is assigned to a MU-MIMO group based on the $SINR_k$, which was determined based on the compressed client-side CSI feedback $V_k$ and on the matrix $D'_k$. FIG. 9 (discussed further below) illustrates one example of how the client $C_k$ may be assigned to a MU-MIMO group based on the $SINR_k$.

Thus, in the example process of FIG. 7, the client $C_k$ may be assigned to a MU-MIMO group based on a value $SINR_k$, which is determined using compressed client-side CSI feedback $V_k$ and the matrix $D'_k$. A full representation of the client-side CSI (such as the channel matrix $H_k$) can be very large, and thus if clients were to transmit full CSI to a beamformer (such as the communications device 100) network overhead may be high. Thus, using the compressed client-side CSI feedback to determine SINR and assigning the client $C_k$ to MU-MIMO groups based on the SINR reduces network overhead as compared to a case in which full CSI feedback is used to assign clients to MU-MIMO groups. Thus, the functioning of the beamformer and the efficiency of the network are improved by utilizing the example process of FIG. 7.

FIG. 8 illustrates an example process of determining a value $SINR_k$, which represents an estimate of what the signal-to-interference-plus-noise ratio of the client $C_k$ would be in a given MU-MIMO group. The example process of FIG. 8 is one example of how process blocks 302, 503, 602, and 705 may be implemented.

In block 801, a noise floor $\eta$ is estimated. For example, an error vector magnitude (EVM) may be used to estimate the noise floor $\eta$.

In block 802, a value $SINR_k$ which represents an estimate of what the signal-to-interference-plus-noise ratio of the client $C_k$ would be in a given MU-MIMO group, is determined using the following formula:

$$SINR_k = \left( \frac{K\eta}{\|D'_k\|^2} + \sum_{j \neq k} \|V^H_k V_j\|^2 \right)^{-1}$$

where the matrices $V_j$ are from those clients $C_j$ (if any) that are also included in the given MU-MIMO group, and K is the total number of clients in the given MU-MIMO group.

FIG. 9 illustrates an example process of assigning a client $C_k$ to a MU-MIMO group based on the value $SINR_k$. The example process of FIG. 9 is one example of how process blocks 303, 504, and 706 may be implemented.

Figure 14:
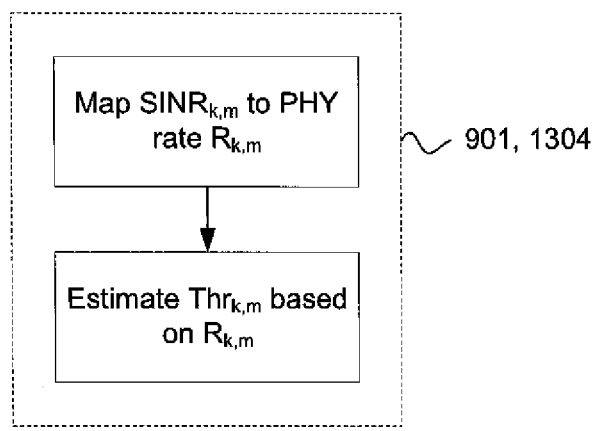
FIG. 14 is a process flow diagram illustrating another example process

In block 901, a throughput of the client $C_k$ in the given MU-MIMO group is estimated based on the $SINR_k$. FIG. 14

(discussed further below) illustrates one example of how a throughput of the client $C_k$ in the given MU-MIMO group may be estimated based on the $SINR_k$.

In block 902, the client $C_k$ is assigned to a MU-MIMO group based on the estimated throughput. Any assignment algorithm that uses client throughput as a variable may be used. For example, the client $C_k$ may be assigned to the MU-MIMO group in which the estimated throughput for the client $C_k$ is the highest. As another example, the estimated throughput of the client $C_k$ in a potential MU-MIMO group may be combined with estimated throughputs of other clients in the potential MU-MIMO group to determine a group-aggregate throughput for the potential MU-MIMO group, and the client devices may be assigned to MU-MIMO groups based on the group-aggregate throughputs of the MU-MIMO groups. For example, client devices may be assigned to the MU-MIMO groups so as to collectively maximize the group-aggregate throughputs. Other variables besides throughput may also be considered in assigning the clients to MU-MIMO groups. For example, client assignment to MU-MIMO groups can be subject to clients' hardware capabilities/configurations and selected policies (for example, a client scheduling policy). For example, clients in the same MU-MIMO group may be required to have the same channel bandwidth configuration (for example, 20 MHz, 40 MHz, 80 MHz). As another example, traffic with a same priority level may be scheduled for transmission at the same time, and hence the clients who are to receive this traffic may be grouped in the same MU-MIMO group. For example, IEEE 802.11ac allows for traffic classification by assigning a traffic ID, and prioritizing the traffic accordingly to provide QoS. Such additional constraints may be accommodated, for example, by defining different client profiles and assigning clients to these profiles, and then assigning the clients to MU-MIMO groups based on client throughput separately for each profile.

Figure 10:
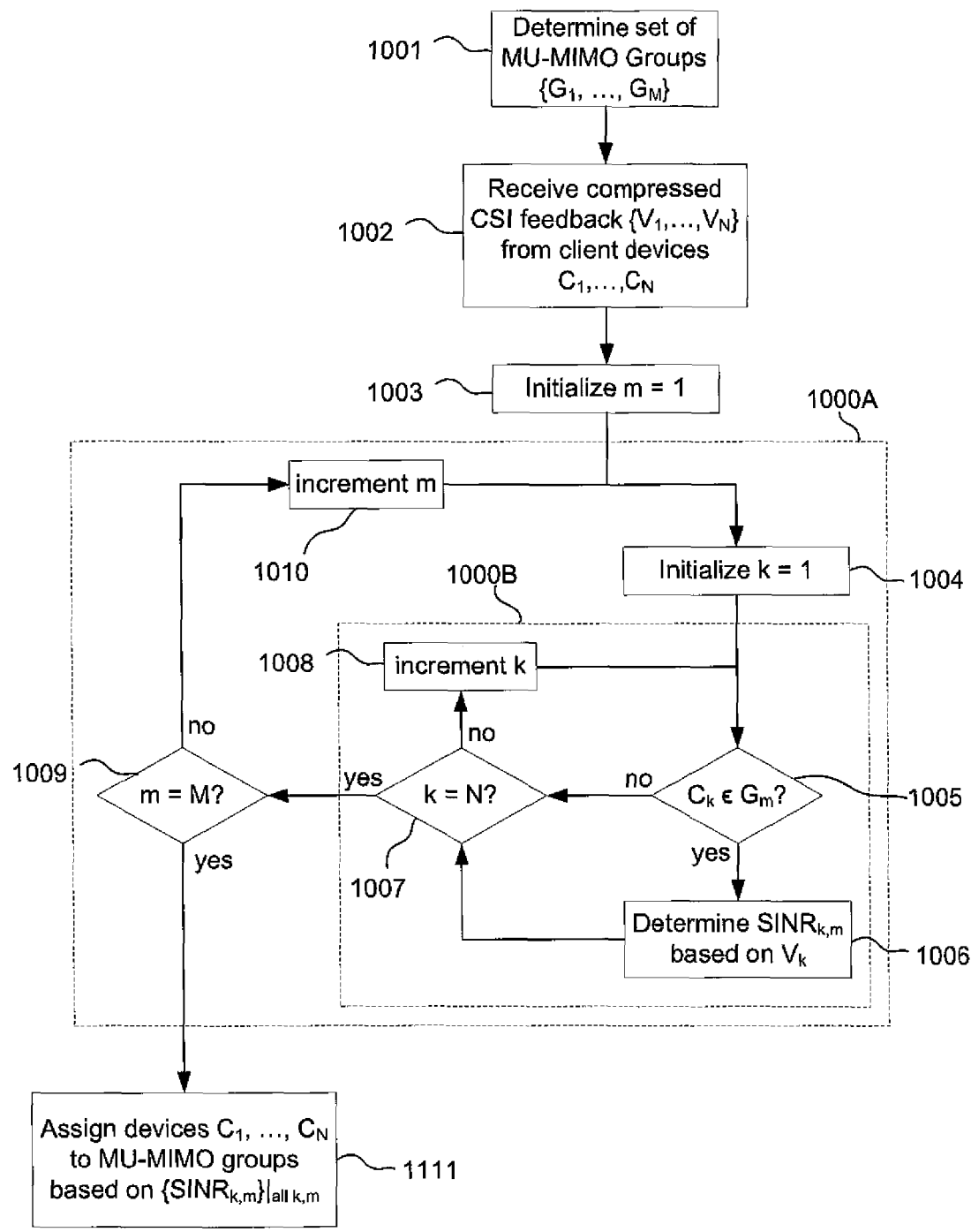
FIG. 10 is a process flow diagram illustrating another example process

FIG. 10 illustrates an example process of assigning clients $C_1, \ldots, C_N$ (such as the client devices 200) to MU-MIMO groups. The example process of FIG. 10 may be performed, for example, by a beamformer (such as the communications device 100).

In block 1001, a set of potential MU-MIMO groups $\{G_1, \ldots G_M\}$ is determined. The set of potential MU-MIMO groups may include each possible group that could be formed using the client devices $C_1$ through $C_N$. For example, if N=3, then the set of potential MU-MIMO groups would include $G_1=\{C_1\}$, $G_2=\{C_2\}$, $G_3=\{C_3\}$, $G_4=\{C_1, C_2\}$, $G_5=\{C_1, C_3\}$, $G_6=\{C_2, C_3\}$, and $G_7=\{C_1, C_2, C_3\}$.

In block 1002, compressed client-side channel state information (CSI) feedback $V_1$ through $V_N$ is received from clients $C_1$ through $C_N$. For example, the client-side CSI measured by the client $C_k$ may be represented by a channel matrix $H_k$, in which case the compressed client-side CSI feedback $V_k$ may be one of the component matrices of the singular value decomposition of $H_k$. For example, the compressed client-side CSI feedback may be the matrix $V_k$ from the singular value decomposition of $H_k$ as represented by $H_k = U_k \cdot D_k \cdot V_k^H$.

In block 1003, an index m is initialized, for example m may be set to m=1. The index m identifies the MU-MIMO groups $G_1$ through $G_M$. After block 1003, a first loop 1000A is begun, which loops over blocks 1004 through 1010 for each value of m (i.e., for each potential MU-MIMO group $G_m$).

In block 1004, an index k is initialized, for example k may be set to k=1. The index k identifies the clients $C_1$ through $C_N$. After block 1004, a second loop 1000B is begun, which loops over blocks 1005 through 1008 for each value of k (i.e., for each potential client $C_k$). The entire second loop 1000B is executed from k=1 to k=N for each iteration of the first loop 1000A (i.e., for each value of m).

In block 1005, it is determined whether the client device $C_k$ is a member of the potential MU-MIMO group $G_m$. If so, the process proceeds to block 1006. If not, the process proceeds to block 1007.

Figure 12:
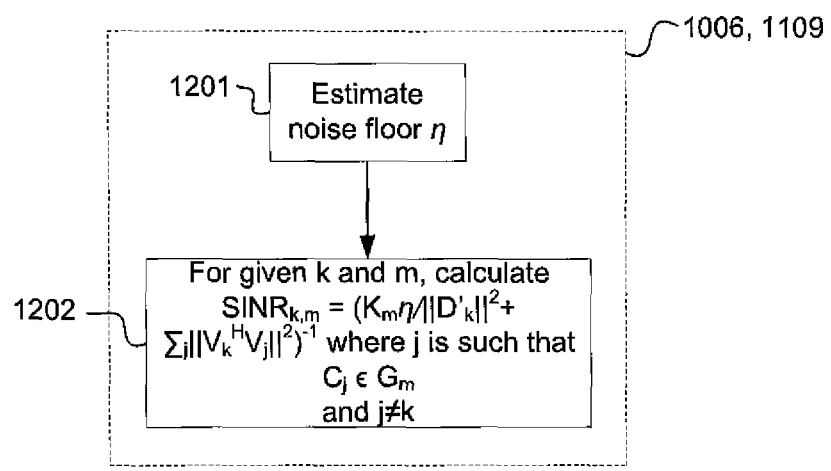
FIG. 12 is a process flow diagram illustrating another example process

In block 1006, a value $SINR_{k,m}$, which represents an estimate of what the signal-to-interference-plus-noise ratio of the client $C_k$ would be in the MU-MIMO group $G_m$, is determined based on the compressed client-side CSI feedback $V_k$. FIG. 12 (discussed further below) illustrates one example of how the $SINR_{k,m}$ may be determined based on the compressed client-side CSI feedback $V_k$.

In block 1007, it is determined whether k=N (i.e., whether all of the clients $C_k$ have been considered). If not, then the process proceeds to block 1008. If so, then the second loop 1000B ends and the process proceeds to block 1009.

In block 1008, k is incremented and a new iteration of the second loop 1000B is begun.

In block 1009, it is determined whether m=M (i.e., whether all of the groups $G_m$ have been considered). If not, then the process proceeds to block 1010. If so, then the first loop 1000A ends and the process proceeds to block 1011.

In block 1010, m is incremented and a new iteration of the first loop 1000A is begun.

Figure 13:
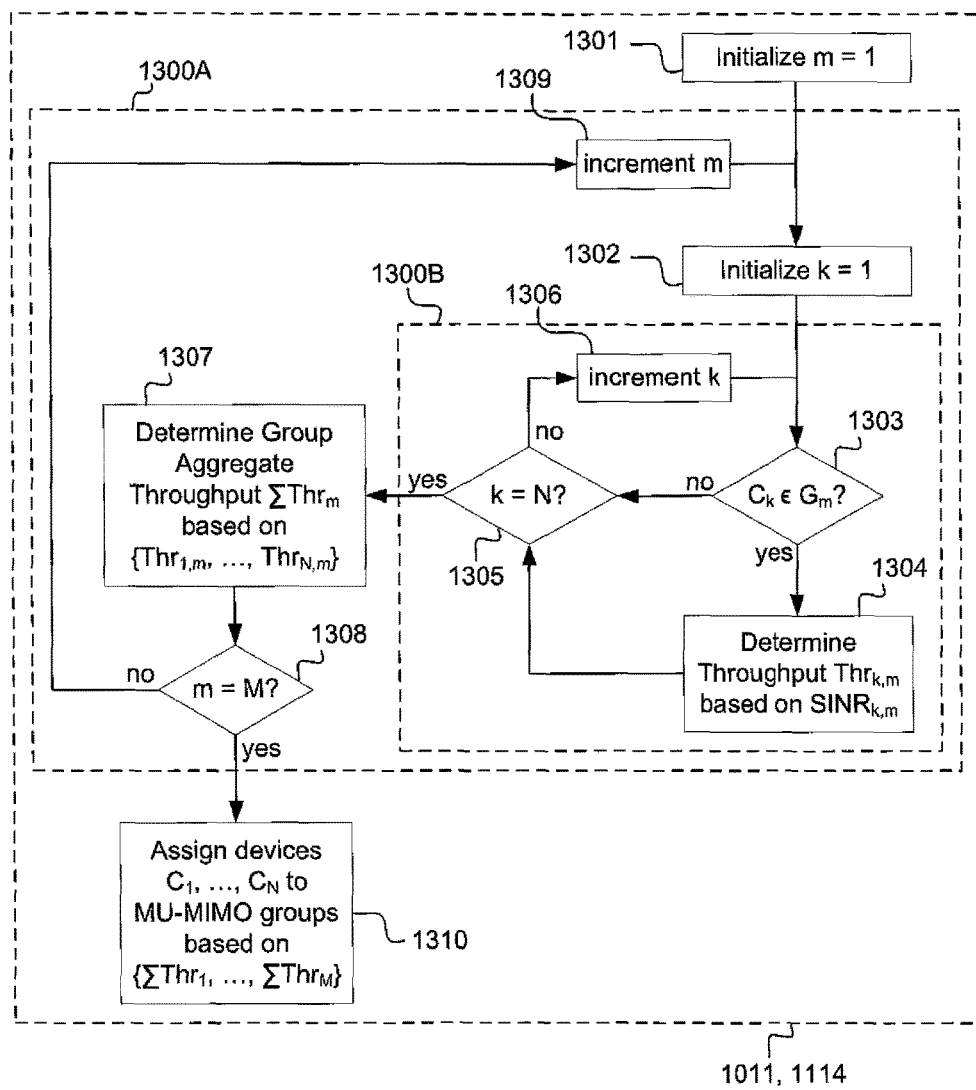
FIG. 13 is a process flow diagram illustrating another example process

At the completion of the first loop 1000A, an $SINR_{k,m}$ value will have been determined for each client device $C_k$ in each of the potential MU-MIMO groups $G_m$ that includes the client device $C_k$. In block 1011, the clients $C_1$ through $C_N$ are assigned to MU-MIMO groups based on this set of values $SINR_{k,m}$. FIG. 13 (discussed further below) illustrates one example of how the clients $C_1$ through $C_N$ may be assigned to MU-MIMO groups based on the values $SINR_{k,m}$.

Thus, in the example process of FIG. 10, the clients may be assigned to MU-MIMO groups based on the values $SINR_{k,m}$, which are determined using compressed client-side CSI feedback $V_k$. A full representation of the client-side CSI (such as the channel matrix $H_k$) can be very large, and thus if client devices were to transmit full CSI to a beamformer (such as the communications device 100) network overhead may be high. Thus, using the compressed client-side CSI feedback to determine SINR and assigning the client $C_k$ to MU-MIMO groups based on the SINR reduces network overhead as compared to a case in which full CSI feedback is used to assign clients to MU-MIMO groups. Thus, the functioning of the beamformer and the efficiency of the network are improved by utilizing the example process of FIG. 10.

Figure 11:
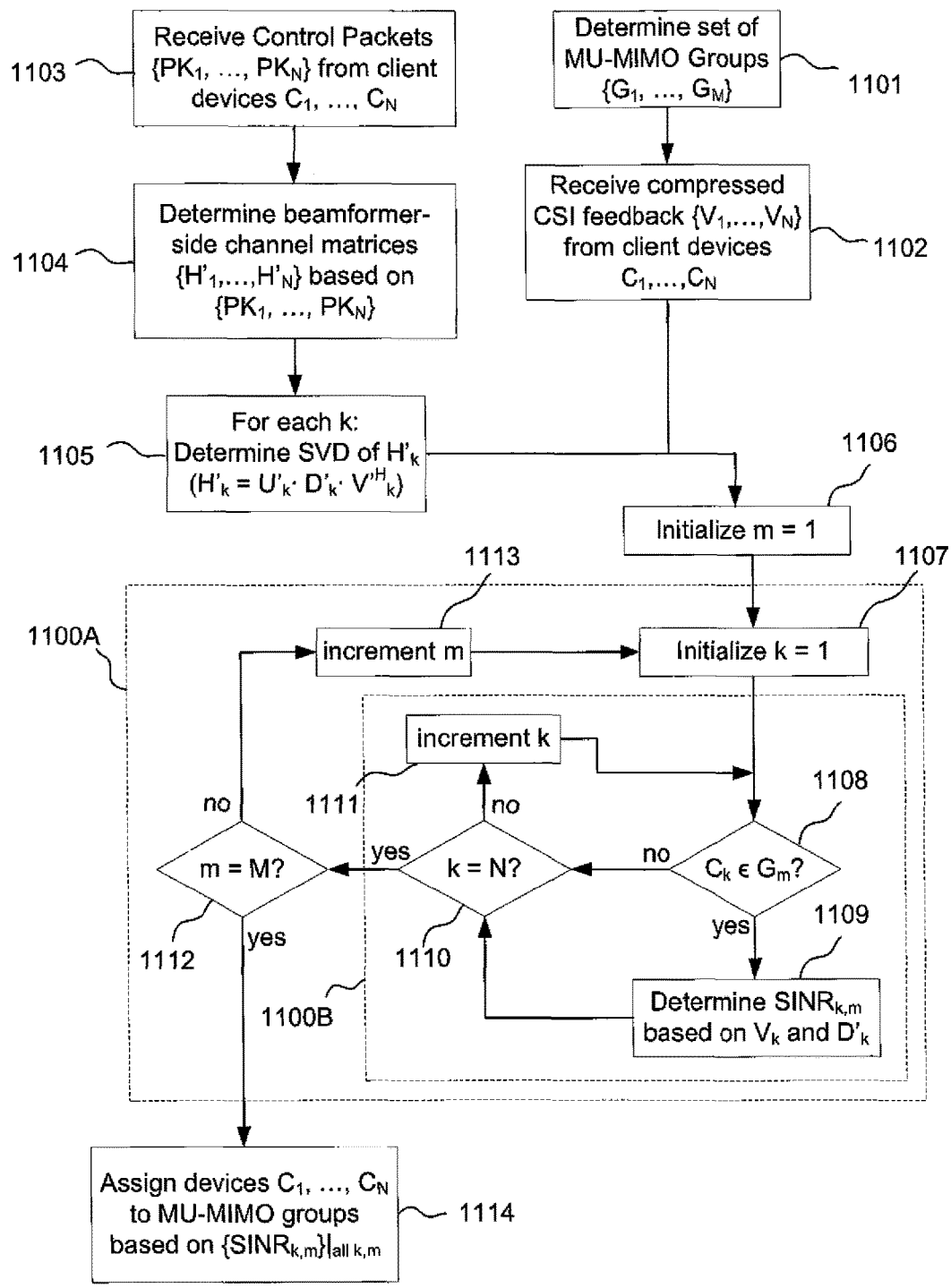
FIG. 11 is a process flow diagram illustrating another example process

FIG. 11 illustrates an example process of assigning clients $C_1, \ldots, C_N$ (such as the client devices 200) to MU-MIMO groups. The example process of FIG. 11 may be performed, for example, by a beamformer (such as the communications device 100).

In block 1101, a set of potential MU-MIMO groups $\{G_1, \ldots, G_M\}$ is determined. The set of potential MU-MIMO groups may include each possible group that could be formed using the client devices $C_1$ through $C_N$.

In block 1102, compressed client-side channel state information (CSI) feedback $V_1$ through $V_N$ is received from clients $C_1$ through $C_N$. For example, the client-side CSI measured by the client $C_k$ may be represented by a channel matrix $H_k$, in which case the compressed client-side CSI feedback $V_k$ may be one of the component matrices of the singular value decomposition of $H_k$. For example, the compressed client-side CSI feedback may be the matrix $V_k$ from the singular value decomposition of $H_k$ as represented by $H_k = U_k \cdot D_k \cdot V_k^H$.

In block 1103, control packets $PK_1$ though $PK_N$ are received from clients $C_1$ though $C_N$, respectively.

In block 1104, beamformer-side channel matrices $H'_1$ through $H'_N$ are determined based on the control packs $PK_1$ though $PK_N$, respectively.

In block 1105, for each value of k, the singular value decomposition of $H'_k$ is determined, given by $H'_k = U'_k \cdot D'_k \cdot V'^H_k$.

In block 1106, an index m is initialized, for example m may be set to m=1. The index m identifies the MU-MIMO groups $G_1$ through $G_M$. After block 1106, a first loop 1100A is begun, which loops over blocks 1107 through 1113 for each value of m (i.e., for each potential MU-MIMO group $G_m$).

In block 1107, an index k is initialized, for example k may be set to k=1. The index k identifies the clients $C_1$ through $C_N$. After block 1107, a second loop 1100B is begun, which loops over blocks 1108 through 1111 for each value of k (i.e., for each potential client $C_k$). The entire second loop 1100B is executed from k=1 to k=N for each iteration of the first loop 1100A (i.e., for each value of m).

In block 1108, it is determined whether the client device $C_k$ is a member of the potential MU-MIMO group $G_m$. If so, the process proceeds to block 1109. If not, the process proceeds to block 1110.

In block 1109, a value $SINR_{k,m}$, which represents an estimate of what the signal-to-interference-plus-noise ratio of the client $C_k$ would be in the MU-MIMO group $G_m$, is determined based on the compressed client-side CSI feedback $V_k$ and on the matrix $D'_k$. FIG. 12 (discussed further below) illustrates one example of how the $SINR_{k,m}$ may be determined based on the compressed client-side CSI feedback $V_k$ and on the matrix $D'_k$.

In block 1110, it is determined whether k=N (i.e., whether all of the clients $C_k$ have been considered). If not, then the process proceeds to block 1111. If so, then the second loop 1100B ends and the process proceeds to block 1112.

In block 1111, k is incremented and a new iteration of the second loop 1100B is begun.

In block 1112, it is determined whether m=M (i.e., whether all of the groups $G_m$ have been considered). If not, then the process proceeds to block 1113. If so, then the first loop 1100A ends and the process proceeds to block 1114.

In block 1113, m is incremented and a new iteration of the first loop 1100A is begun.

At the completion of the first loop 1100A, an $SINR_{k,m}$ value will have been determined for each client device $C_k$ in each of the potential MU-MIMO groups $G_m$ that includes the client device $C_k$. In block 1114, the clients $C_1$ through $C_N$ are assigned to MU-MIMO groups based on this set of values $SINR_{k,m}$. FIG. 13 (discussed further below) illustrates one example of how the clients $C_1$ through $C_N$ may be assigned to MU-MIMO groups based on the values $SINR_{k,m}$.

Thus, in the example process of FIG. 11, the clients may be assigned to MU-MIMO groups based on the values $SINR_{k,m}$, which are determined using compressed client-side CSI feedback $V_k$ and the matrix $D'_k$. A full representation of the client-side CSI (such as the channel matrix $H_k$) can be very large, and thus if client devices were to transmit full CSI to a beamformer (such as the communications device 100) network overhead may be high. Thus, using the compressed client-side CSI feedback to determine SINR and assigning the client $C_k$ to MU-MIMO groups based on the SINR reduces network overhead as compared to a case in which full CSI feedback is used to assign clients to MU-MIMO groups. Thus, the functioning of the beamformer and the efficiency of the network are improved by utilizing the example process of FIG. 11.

FIG. 12 illustrates an example process of determining a value $SINR_{k,m}$, which represents an estimate of what the signal-to-interference-plus-noise ratio of the client $C_k$ would be in the MU-MIMO group $G_m$. The example process of FIG. 8 is one example of how process blocks 1006 and 1109 may be implemented.

In block 1201, a noise floor $\eta$ is estimated. For example, an error vector magnitude (EVM) may be used to estimate the noise floor $\eta$.

In block 1202, a value $SINR_{k,m}$ which represents an estimate of what the signal-to-interference-plus-noise ratio of the client $C_k$ would be in the MU-MIMO group $G_m$, is determined using the following formula:

$$SINR_{k,m} = \left( \frac{K_m \eta}{\|D'_k\|^2} + \sum_{j \neq k} \|V_k^H V_j\|^2 \right)^{-1}$$

where j is such that $C_j \in G_m$, and $K_m$ is the number of clients in the group $G_m$.

FIG. 13 illustrates an example process of assigning clients $C_1$ through $C_N$ to MU-MIMO groups based on the values $SINR_{k,m}$. The example process of FIG. 13 is one example of how process blocks 1011 and 1114 may be implemented.

In block 1301, an index m is initialized, for example m may be set to m=1. The index m identifies the MU-MIMO groups $G_1$ through $G_M$. After block 1301, a first loop 1300A is begun, which loops over blocks 1302 through 1309 for each value of m (i.e., for each potential MU-MIMO group $G_m$).

In block 1302, an index k is initialized, for example k may be set to k=1. The index k identifies the clients $C_1$ through $C_N$. After block 1032, a second loop 1300B is begun, which loops over blocks 1303 through 1306 for each value of k (i.e., for each potential client $C_k$). The entire second loop 1300B is executed from k=1 to k=N for each iteration of the first loop 1300A (i.e., for each value of m).

In block 1303, it is determined whether the client device $C_k$ is a member of the potential MU-MIMO group $G_m$. If so, the process proceeds to block 1304. If not, the process proceeds to block 1305.

In block 1304, a throughput $Thr_{k,m}$, which represents an estimate of what the throughput of the client $C_k$ would be in the MU-MIMO group $G_m$, is determined based on the $SINR_{k,m}$. FIG. 14 (discussed further below) illustrates one example of how the throughput $Thr_{k,m}$ may be determined based on the $SINR_{k,m}$.

In block 1305, it is determined whether k=N (i.e., whether all of the clients $C_k$ have been considered). If not, then the process proceeds to block 1306. If so, then the second loop 1300B ends and the process proceeds to block 1307.

In block 1306, k is incremented and a new iteration of the second loop 1300B is begun.

In block 1307, a group aggregate throughput $\Sigma Thr_m$ is determined for the MU-MIMO group $G_m$, based on the client throughputs $\{Thr_{1,m}, \ldots, Thr_{N,m}\}$. For example, the aggregate throughput $\Sigma Thr_m$ may be the sum of the client throughputs of the clients $C_k$ that are included in the group $G_m$.

In block 1308, it is determined whether m=M (i.e., whether all of the groups $G_m$ have been considered). If not, then the process proceeds to block 1309. If so, then the first loop 1300A ends and the process proceeds to block 1310.

In block 1309, m is incremented and a new iteration of the first loop 1300A is begun.

At the completion of the first loop 1300A, a group aggregate throughput $\Sigma Thr_m$ will have been determined for each group $G_m$. In block 1310 the client devices $C_1$ through ON may be assigned to MU-MIMO groups based on the group aggregate throughputs $\Sigma Thr_m$. For example, client devices may be assigned to the MU-MIMO groups so as to collectively maximize the group-aggregate throughputs.

FIG. 14 illustrates an example process for estimating the throughput $Thr_{k,m}$ based on the $SINR_{k,m}$. The process of FIG. 14 is one example of how process blocks 901 and 1304 may be implemented.

In block 1401, $SINR_{k,m}$ values are mapped to PHY rates $R_{k,m}$. For example, a known relationship between signal-to-interference-plus-noise and PHY rate may be used to map $SINR_{k,m}$ values to PHY rates $R_{k,m}$. For example, IEEE 802.11ac includes table showing a relationship between signal-to-interference-plus-noise values and PHY rate values. As another example, a relationship between signal-to-interference-plus-noise values and PHY rate values may be determined experimentally or by modeling.

In block 1402, the throughputs $Thr_{k,m}$ may be determined based on the PHY rates $R_{k,m}$. For example, throughputs $Thr_{k,m}$ may be determined using the following formula:

$$Thr_{k,m} = \frac{DATA_k}{\frac{DATA_k}{R_{k,m}} + T_m}$$

where $DATA_k$ is the amount of data to be transmitted to client $C_k$ and $T_m$ is the network overhead time associated with group $G_m$. Network overhead time $T_m$ may include, for example, time that is spent to enable the transmission of the data to the group $G_m$, such as the time spent on the sounding procedure, time spent on control-plane signaling, buffer periods between transmissions, etc. As another example, network overhead time $T_m$ may include all the time that would elapse between successive group transmissions to the group $G_m$, excluding the time that is spent sending the data to the group $G_m$.

By using the example processes described above, clients may be assigned to MU-MIMO groups in such a way that network performance is improved. For example, aggregate throughput of the network may be maximized. Moreover, because the example processes described above do not require full CSI to be transmitted from the clients to the beamformer, the performance of the beamformer and the efficiency of the network may be improved. In addition, the example processes described above are compatible with standards that do not provide for transmitting full CSI feedback from clients to beamformer, such as IEEE 802.11ac.

What is claimed is:

1. A communications device, comprising:
communications circuitry to wirelessly communicate with a client device; and
control circuitry to determine a signal-to-interference-plus-noise ratio (SINR) for the client device based on compressed client-side channel state information received from the client device, and to assign the client device to a multi-user-multiple-input-multiple-output (MU-MIMO) group based on the SINR;
determine beamformer-side channel state information based on a control packet received from the client device, the beamformer-side channel state information being represented by a channel matrix H',
determine the singular value decomposition of the channel matrix H', which is represented by $H'=U'\cdot D'\cdot V'H$, and
use the matrix D' in determining the SINR,
wherein H' respresents beamformer-side channel state information (CSI),
wherein U' is a unitary matrix,
wherein D' is a scalar diagonal matrix,
wherein V' is compressed CSI feedback,
wherein H represents client-side CSI.

2. The communications device of claim 1,
wherein the control circuitry is to determine the SINR for the client device based on beamformer-side channel state information obtained from a control packet received from the client device.

3. The communications device of claim 1,
wherein the control circuitry is to estimate a throughput of the client device in the MU-MIMO group based on the SINR, and to assign the client device to the MU-MIMO group based on the throughput.

4. A method of controlling a beamforming device, comprising:
at the beamforming device, receiving compressed client-side channel state information from a client device,
determining a signal-to-interference-plus-noise ratio (SINR) for the client device based on the compressed client-side channel state information, and
assigning the client device to a multi-user-multiple-input-multiple-output (MU-MIMO) group based on the SINR;
at the beamforming device, receiving a control packet from the client device;
determining beamformer-side channel state information based on the control packet, the beamformer-side channel state information being represented by a channel matrix H';
determining the singular value decomposition of the channel matrix H', which is represented by $H'=U'\cdot D'\cdot V'H$; and
using the matrix D' in determining the SINR,
wherein H' respresents beamformer-side channel state information (CSI),
wherein U' is a unitary matrix,
wherein D' is a scalar diagonal matrix,
wherein V' is compressed CSI feedback,
wherein H represents client-side CSI.

5. The method of claim 4,
wherein the determining the SINR for the client device is further based on beamformer-side channel state information obtained from a control packet received from the client device.

6. The method of claim 4,
wherein the assigning the client device to the MU-MIMO group based on the SINR includes estimating a throughput of the client device in the MU-MIMO group based on the SINR.

7. A non-transitory machine-readable medium that stores instructions that, when executed by a processor of a beamforming device, cause the beamforming device to:
determine potential multi-user-multiple-input-multiple-output (MU-MIMO) groupings of a plurality of client devices;

for each of the plurality of client devices and each of the potential MU-MIMO grouping in which the respective client device is included, estimate a signal-to-interference-plus-noise ratio (SINR) based on compressed client-side channel state information received by the beamforming device from the respective client device; and assign the plurality of client devices to MU-MIMO groups based on the estimated SINRs;

determine beamformer-side channel state information for the respective client device based on a control packet received from the respective client device, the beamformer-side channel state information for the respective client device being represented by a channel matrix $H'_k$, determine the singular value decomposition of the channel matrix $H'_k$, which is represented by $H'_k = U'_k \cdot D'_k \cdot V'^H_k$, and use the matrix $D'_k$ in determining each of the SINRs corresponding to the respective client device, where k is an index corresponding to the respective client device, wherein $H'$ respresents beamformer-side channel state information (CSI), wherein $U'$ is a unitary matrix, wherein $D'$ is a scalar diagonal matrix, wherein $V'$ is compressed CSI feedback, wherein $H$ represents client-side CSI.

8. The non-transitory machine-readable medium of claim 7, wherein the instructions are to, when executed by the processor of the beamforming device, cause the beamforming device to:

for each of the plurality of client devices, determine beamformer-side channel state information from a control packet received from the respective client device; and for each of the plurality of client devices, determine each of the SINRs corresponding to the respective client device based on the beamformer-side channel state information corresponding to the respective client device.

9. The non-transitory machine-readable medium of claim 7, wherein the instructions are to, when executed by the processor of the beamforming device, cause the beamforming device to:

for each of the plurality of client devices and each of the potential MU-MIMO grouping in which the respective client device is included, estimate a throughput of the respective client device in the respective potential MU-MIMO grouping based on the SINR corresponding to the respective client device and the respective potential MU-MIMO grouping, and assign the plurality of client devices to MU-MIMO groups based on the estimated throughputs.

* * * * *